United States Patent
Kuper

(10) Patent No.: US 12,170,810 B2
(45) Date of Patent: *Dec. 17, 2024

(54) SOUND BAR TO PROVIDE INFORMATION ASSOCIATED WITH A MEDIA ITEM

(71) Applicant: Sonos, Inc., Santa Barbara, CA (US)

(72) Inventor: Ron Kuper, Arlington, MA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,938

(22) Filed: Jul. 10, 2023

(65) Prior Publication Data

US 2024/0015358 A1  Jan. 11, 2024

Related U.S. Application Data

(63) Continuation of application No. 17/510,114, filed on Oct. 25, 2021, now Pat. No. 11,743,533, which is a (Continued)

(51) Int. Cl.
*H04N 21/436* (2011.01)
*H04L 65/612* (2022.01)
(Continued)

(52) U.S. Cl.
CPC ..... *H04N 21/43615* (2013.01); *H04L 65/612* (2022.05); *H04N 21/47217* (2013.01);
(Continued)

(58) Field of Classification Search
CPC ....... H04N 21/43615; H04N 21/47217; H04N 21/4722; H04N 21/4828; H04N 21/8133;
(Continued)

(56) References Cited

U.S. PATENT DOCUMENTS 5,440,644 A  8/1995  Farinelli et al.
5,761,320 A  6/1998  Farinelli et al.
(Continued)

FOREIGN PATENT DOCUMENTS

| EP | 1389853 A1 | 2/2004 |
|---|---|---|
| WO | 200153994 | 7/2001 |
| WO | 2003093950 A2 | 11/2003 |

OTHER PUBLICATIONS

Advisory Action mailed on Jun. 27, 2018, issued in connection with U.S. Appl. No. 14/557,099, filed Dec. 1, 2014, 4 pages.
(Continued)

*Primary Examiner* — John R Schnurr
(74) *Attorney, Agent, or Firm* — Akerman LLP

(57) ABSTRACT

Example techniques relate to a soundbar that provides information associated with a media item. In an example implementation, the soundbar plays back audio associated with the particular media item. The soundbar also sends instructions to cause a mobile device to display graphical representations of first information associated with the particular media item while the soundbar playing back the particular media item. The soundbar further sends a request for second information associated with the particular media item, receives, from a server of a cloud computing service, data representing the requested second information associated with the particular media item, causes a television to display graphical representations of the requested second information associated with the particular media item on a display of the television while the sound-bar playback device is playing back the audio associated with the particular media item.

20 Claims, 6 Drawing Sheets

Related U.S. Application Data continuation of application No. 16/683,083, filed on Nov. 13, 2019, now Pat. No. 11,159,845, which is a continuation of application No. 14/557,099, filed on Dec. 1, 2014, now abandoned.

(51) Int. Cl.

| | |
|---|---|
| *H04N 21/472* | (2011.01) |
| *H04N 21/4722* | (2011.01) |
| *H04N 21/482* | (2011.01) |
| *H04N 21/81* | (2011.01) |

(52) U.S. Cl.
CPC ..... *H04N 21/4722* (2013.01); *H04N 21/4828* (2013.01); *H04N 21/8133* (2013.01); *H04R 2227/003* (2013.01); *H04R 2227/005* (2013.01)

(58) Field of Classification Search
CPC ............ H04L 65/612; H04R 2227/003; H04R 2227/005
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,483,538 | B2 | 1/2009 | McCarty et al. |
| 7,571,014 | B1 | 8/2009 | Lambourne et al. |
| 7,590,772 | B2 | 9/2009 | Marriott et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,291,349 | B1 | 10/2012 | Park et al. |
| 8,483,853 | B1 | 7/2013 | Lambourne |
| 8,490,131 | B2 | 7/2013 | Sugiyama et al. |
| 8,732,168 | B2 | 5/2014 | Johnson |
| 8,737,916 | B2 | 5/2014 | Hwang |
| 8,849,819 | B2 | 9/2014 | Johnson |
| 9,489,383 | B2 | 11/2016 | Hyman et al. |
| 9,779,613 | B2 | 10/2017 | Bates |
| 10,331,736 | B2 | 6/2019 | Beckhardt |
| 11,372,656 | B2 | 6/2022 | Corbin |
| 11,743,533 | B2 * | 8/2023 | Kuper .............. H04N 21/43615 725/78 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0048224 | A1 | 4/2002 | Dygert et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2006/0171395 | A1 | 8/2006 | Deshpande |
| 2007/0142944 | A1 | 6/2007 | Goldberg et al. |
| 2008/0113325 | A1 | 5/2008 | Mellqvist et al. |
| 2008/0254790 | A1 | 10/2008 | Baldridge et al. |
| 2009/0128335 | A1 | 5/2009 | Leung |
| 2009/0216745 | A1 | 8/2009 | Allard et al. |
| 2010/0005170 | A1 | 1/2010 | Huotari et al. |
| 2010/0045928 | A1 | 2/2010 | Levy |
| 2010/0235741 | A1 | 9/2010 | Newman et al. |
| 2010/0299639 | A1 | 11/2010 | Ramsay et al. |
| 2011/0106954 | A1 | 5/2011 | Chatterjee et al. |
| 2012/0171958 | A1 | 7/2012 | Cornett et al. |
| 2012/0204213 | A1 | 8/2012 | Lau |
| 2012/0291066 | A1 | 11/2012 | Lourdeaux |
| 2012/0295542 | A1 | 11/2012 | Telemi |
| 2012/0311641 | A1 | 12/2012 | Allard |
| 2013/0124606 | A1 | 5/2013 | Carpenter et al. |
| 2013/0211843 | A1 | 8/2013 | Clarkson |
| 2013/0317635 | A1 | 11/2013 | Bates et al. |
| 2013/0347018 | A1 | 12/2013 | Limp et al. |
| 2014/0068520 | A1 | 3/2014 | Missig et al. |
| 2014/0095965 | A1 | 4/2014 | Li |
| 2014/0129015 | A1 | 5/2014 | Lindahl et al. |
| 2014/0160078 | A1 | 6/2014 | Seo et al. |
| 2014/0277639 | A1 | 9/2014 | Gomes-Casseres et al. |
| 2014/0359685 | A1 | 12/2014 | Liu et al. |
| 2015/0018992 | A1 | 1/2015 | Griffiths et al. |
| 2015/0019976 | A1 * | 1/2015 | Lee .................... H04N 21/8133 715/733 |
| 2015/0078586 | A1 | 3/2015 | Ang et al. |
| 2015/0242073 | A1 | 8/2015 | Munoz et al. |
| 2015/0248268 | A1 | 9/2015 | Kumar et al. |
| 2015/0277851 | A1 | 10/2015 | Kumar et al. |
| 2015/0286461 | A1 | 10/2015 | Trammell |
| 2015/0324552 | A1 | 11/2015 | Beckhardt |
| 2017/0026686 | A1 | 1/2017 | Glazier et al. |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action mailed on Jul. 11, 2016, issued in connection with U.S. Appl. No. 14/557,099, filed Dec. 1, 2014, 16 pages.
Final Office Action mailed on Jun. 12, 2019, issued in connection with U.S. Appl. No. 14/557,099, filed Dec. 1, 2014, 18 pages.
Final Office Action mailed on Jun. 13, 2017, issued in connection with U.S. Appl. No. 14/557,099, filed Dec. 1, 2014, 21 pages.
Final Office Action mailed on Apr. 17, 2018, issued in connection with U.S. Appl. No. 14/557,099, filed Dec. 1, 2014, 22 pages.
First Action Interview Office Action Summary mailed on Feb. 17, 2016, issued in connection with U.S. Appl. No. 14/557,099, filed Dec. 1, 2014, 7 pages.
http://corporate.musicchoice.com/about-US/, last visited Dec. 8, 2014, 2 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Nov. 9, 2016, issued in connection with U.S. Appl. No. 14/557,099, filed Dec. 1, 2014, 17 pages.
Non-Final Office Action mailed on Dec. 11, 2018, issued in connection with U.S. Appl. No. 14/557,099, filed Dec. 1, 2014, 19 pages.

(56) References Cited

OTHER PUBLICATIONS

Non-Final Office Action mailed on Nov. 24, 2017, issued in connection with U.S. Appl. No. 14/557,099, filed Dec. 1, 2014, 21 pages.
Notice of Allowance mailed Jun. 25, 2021, issued in connection with U.S. Appl. No. 16/683,083, filed Nov. 13, 2019, 8 pages.
Notice of Allowance mailed on Apr. 14, 2023, issued in connection with U.S. Appl. No. 17/510,114, filed Oct. 25, 2021, 10 pages.
Palm, Inc., "Handbook for the Palm VII Handheld," May 2000, 311 pages.
Pre-Interview First Office Action mailed on Dec. 21, 2015, issued in connection with U.S. Appl. No. 14/557,099, filed Dec. 1, 2014, 5 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

SOUND BAR TO PROVIDE INFORMATION ASSOCIATED WITH A MEDIA ITEM

CROSS REFERENCE TO RELATED APPLICATIONS

This application claims priority under 35 U.S.C. § 120 to and is a continuation of U.S. application Ser. No. 17/510,114, filed Oct. 25, 2021, which claims priority under 35 U.S.C. § 120 to and is a continuation of U.S. application Ser. No. 16/683,083, filed Nov. 13, 2019, and issued as U.S. Pat. No. 11,159,845 on Oct. 26, 2021, entitled "Sound Bar to Provide Information Associated with a Media Item." The content of these applications is incorporated herein by reference in its entirety.

U.S. application Ser. No. 16/683,083 claims priority under 35 U.S.C. § 120 to and is a continuation of U.S. application Ser. No. 14/557,099, filed on Dec. 1, 2014, entitled "Providing Information Associated with a Media Item," which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sanos Wireless HiFi System enables people to experience music from a plethora of sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
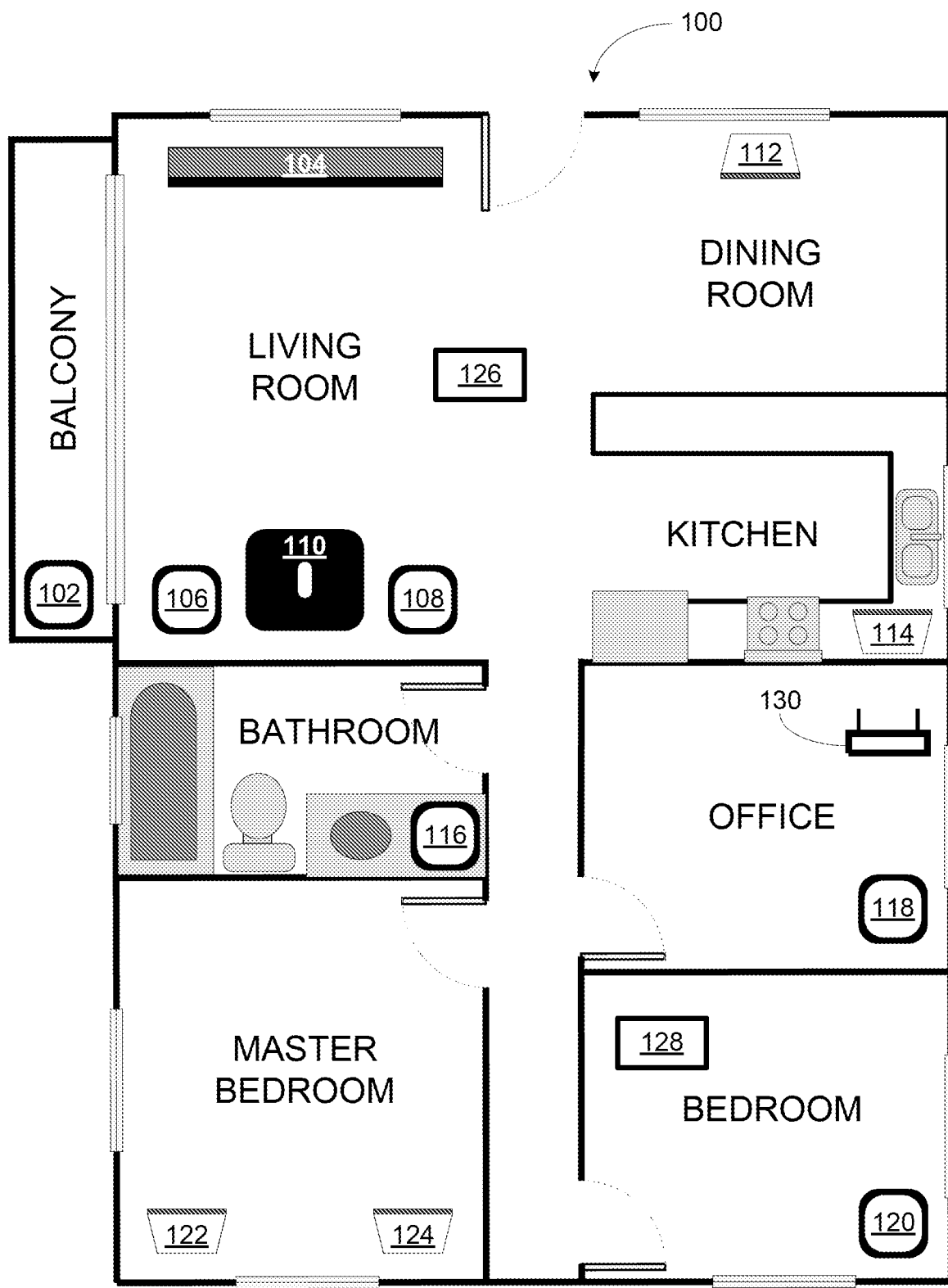
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

During playback of a media item by a media playback system, some information associated with the media item may be provided on a control device used to manage and control the media playback system. For instance, a track title, a name of an artist, an album title, and/or album artwork associated with the media item being played may be displayed on a control interface provided on a graphical display of the control device. In some cases, however, the information provided on the graphical display of the control device may be limited due to an amount of display space available on the graphical display, and/or an amount of information that is available for display. As such, to enhance an experience of the media item, additional information associated with the media item may be provided on an additional graphical display, while the media playback system is playing the media item.

Some examples described herein involve providing for display, information associated with the media item that is additional to the information provided on the control interface of the control device while the media item is being played by the media playback system. In one example, a computing device may receive data indicating a media item being played by a playback device of a media playback system, and based on the data indicating the media item, transmit to one or more media information sources, a request for information associated with the media item. Subsequently, the computing device may receive from the one or more media information sources, data indicating information associated with the media item, and provide for display on a graphical display, representations of at least a portion of the information. In one case, functions of the computing device for providing the information associated with the media item may be performed by a software application installed on the computing device.

In one case, the computing device may be a network device that is in communication with the media playback system playing the media item, the graphical display, and one or more media information sources. When the media playback system is playing, or is about to play the media item, the computing device may receive from one or more devices in the media playback system, the data indicating the media item. In one case, the computing device may subscribe to data indicating media items being played by the media playback system, and may accordingly receive data from the media playback system when the media playback system is playing, or is about to play a media item. In another case, the computing device may receive the data after transmitting to the media playback system, a request for the data. Other examples are also possible.

The data indicating the media item may include metadata associated with the media item, such as a track title, an artist name, an album name, a genre, and/or a track identification of the media item for a corresponding streaming media service, among other possibilities. In one case, the metadata associated with the media item may have been provided to the media playback system by the service provider from which the media playback system is streaming the media item.

The computing device may then transmit to the one or more media information sources, a request for information based on the data indicating the media item, and subsequently, receive from the one or more servers associated with the one or more media information sources, data indicating information associated with the media item. For instance, the computing device may transmit to the one or more media information sources, a request for information on the artist associated with the media item, and subsequently receive information on the artist, such as a biography of the artist.

The one or more media information source may include one or more of a service provider from which the media item is being streamed, a service provider from which the media item is available, a media information aggregation service, a social network interface, and a server associated with the media playback system.

In one example, the computing device may transmit the request for information to each of the one or more media information sources at substantially the same time. In another example, the computing device may transmit the request for information to each of the one or more media information sources sequentially according to an information source priority corresponding to each respective media information source. For instance, a first media information source of the one or more media information sources may have a higher information source priority than a second media information source of the one or more media information sources. In such a case, the computing device may first send to the first media information source, a first request for information associated with the media item. Then, after receiving data from the first media information source in response to the first request, the computing device may send to the second media information source, a second request for information associated with the media item not already indicated by the data received from the first media information source. Other examples are also possible.

Upon receiving the data indicating information associated with the media item, the computing device may cause for display on the graphical display in communication with the computing device, representations of at least a portion of the information. In one example, the display of the representations may be provided according to a display template.

For instance, a first region of the graphical display may display information relating to a zone or zone group within which the media item is playing, a second region of the graphical display may display information relating to one or more social media feeds associated with the media item, a third region of the graphical display may display information relating to trivia associated with the media item, and a fourth region of the graphical display may display information relating to song lyrics of the media item, among other possibilities.

As such, in one example, the computing device may, as part of causing for display the representations of at least the portion of the information, process the data indicating the information to categorize the information based on the display template. In one case, the computing device may process the data by parsing the information and determining a category of the information. For instance, if a first portion of the information indicates social media feeds relating to the artist of the media item, representations of the first portion of information may be provided for display in the second region of the graphical display.

In another case, the computing device may process the data based on a source of the data. For instance, if a second portion of the information is received from a media information source that provides song lyrics for media items, representations of the second portion of the information may be provided for display in the fourth region of the graphical display. Other examples are also possible.

A fifth region of the graphical display may display information relating to the particular media item, such as track title, artist name, album name, and/or album art, among other possibilities. The information displayed in the second region may include information also displayed on the controller interface of the control device while the media item is playing.

In one example, the computing device may further request from the one or more media information sources, information associated with a next media item that is to be played by the media playback system upon completing playback of the media item being played by the media playback system. In one case, the computing device may also cause the graphical display to display in a sixth region of the graphical display, representations of at least a portion of the information associated with the next media item. Other examples are also possible.

In one example, the computing device may provide for display on the graphical display representations of at least the portions of the information after all data indicating the information has been received, and processed. In another example, the computing device may provide for display on the graphical display, representations of at least the portions of the information as data indicating the information is received, and processed. For instance, if data indicating song lyrics of the media item is received and processed before data indicating trivia associated with the media item, the song lyrics may be displayed in the fourth region before the trivia associated with the media item is displayed in the third region. Other examples are also possible.

As indicated above, the present discussions involve receiving and providing for display, information associated with the media item. In one aspect, a computing device is provided. The computing device includes a processor and memory having stored thereon instructions executable by the processor to cause the device to perform functions. The functions include receiving data indicating a media item being played by a playback device of a media playback system, based on the data indicating the media item, transmitting to one or more media information sources, a request for information associated with the media item, receiving from the one or more media information sources, data indicating information associated with the media item, and while the playback device is playing the media item, providing for display on a graphical display, representations of at least a portion of the information.

In another aspect, a method is provided. The method involves receiving by a computing device, data indicating a media item being played by a playback device of a media playback system, based on the data indicating the media item, transmitting from the computing device to one or more media information sources, a request for information associated with the media item, receiving by the computing device from the one or more media information sources, data indicating information associated with the media item, and while the playback device is playing the media item, providing by the computing device for display on a graphical display, representations of at least a portion of the information.

In a further aspect, a non-transitory computer readable medium is provided. The non-transitory computer readable medium has stored thereon instructions executable by a computing device to cause the computing device to perform functions. The functions include receiving data indicating a media item being played by a playback device of a media playback system, based on the data indicating the media item, transmitting to one or more media information sources, a request for information associated with the media item, receiving from the one or more media information sources, data indicating information associated with the media item, and while the playback device is playing the media item, providing for display on a graphical display, representations of at least a portion of the information.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
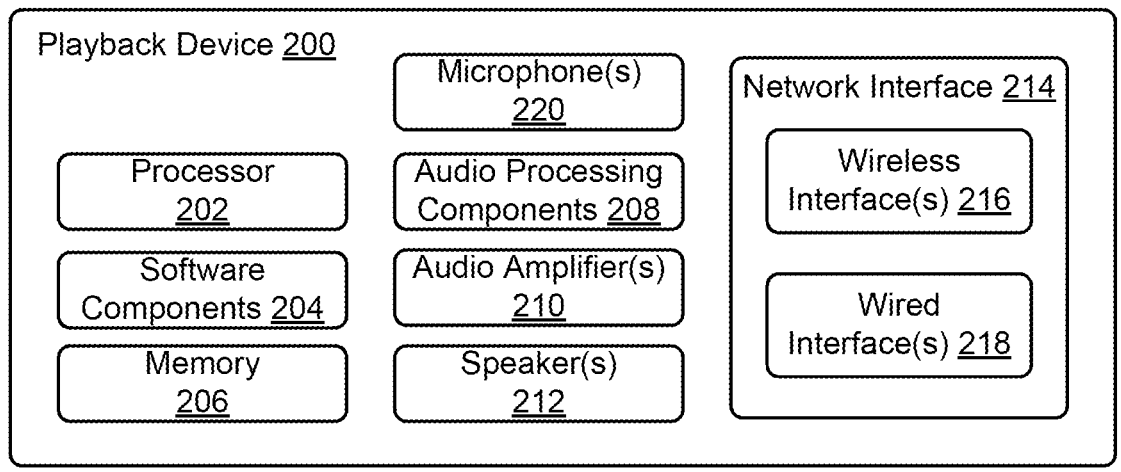
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, microphone(s) 220, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more of digital-to-analog converters (DAC), analog-to-digital converters (ADC), audio preprocessing components, audio enhancement components, and a digital signal processor (DSP), among others. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The microphone(s) 220 may include an audio sensor configured to convert detected sounds into electrical signals. The electrical signal may be processed by the audio processing components 208 and/or the processor 202. The microphone(s) 220 may be positioned in one or more orientations at one or more locations on the playback device 200. The microphone(s) 220 may be configured to detect sound within one or more frequency ranges. In one case, one or more of the microphone(s) 220 may be configured to detect sound within a frequency range of audio that the playback device 200 is capable or rendering. In another case, one or more of the microphone(s) 220 may be configured to detect sound within a frequency range audible to humans. Other examples are also possible.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
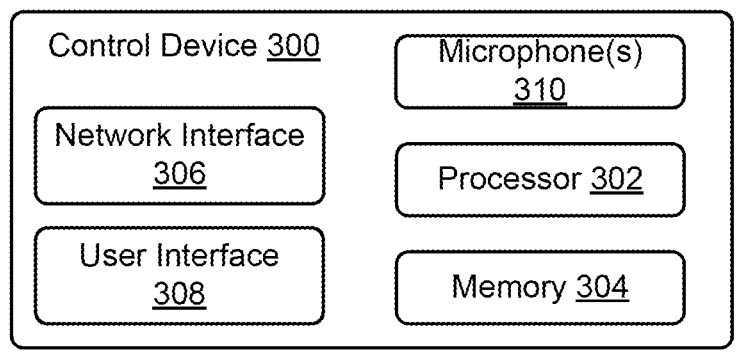
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, and microphone(s) 310. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

The microphone(s) 310 may include an audio sensor configured to convert detected sounds into electrical signals. The electrical signal may be processed by the processor 302. In one case, if the control device 300 is a device that may also be used as a means for voice communication or voice recording, one or more of the microphone(s) 310 may be a microphone for facilitating those functions. For instance, the one or more of the microphone(s) 310 may be configured to detect sound within a frequency range that a human is capable of producing and/or a frequency range audible to humans. Other examples are also possible.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
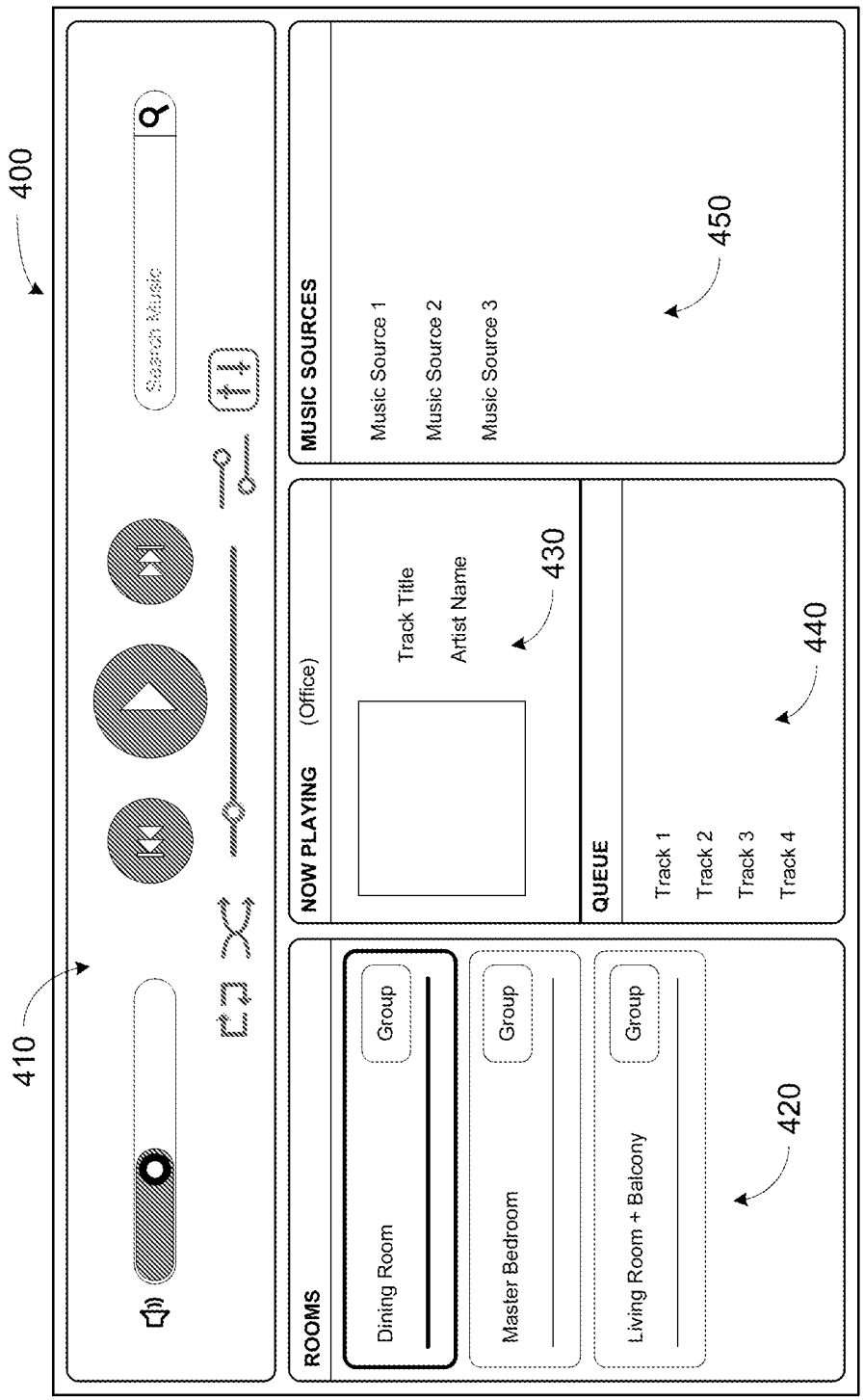
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, control devices, playback zone configurations, and media item sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods for Providing Information Associated with a Media Item

Figure 5:
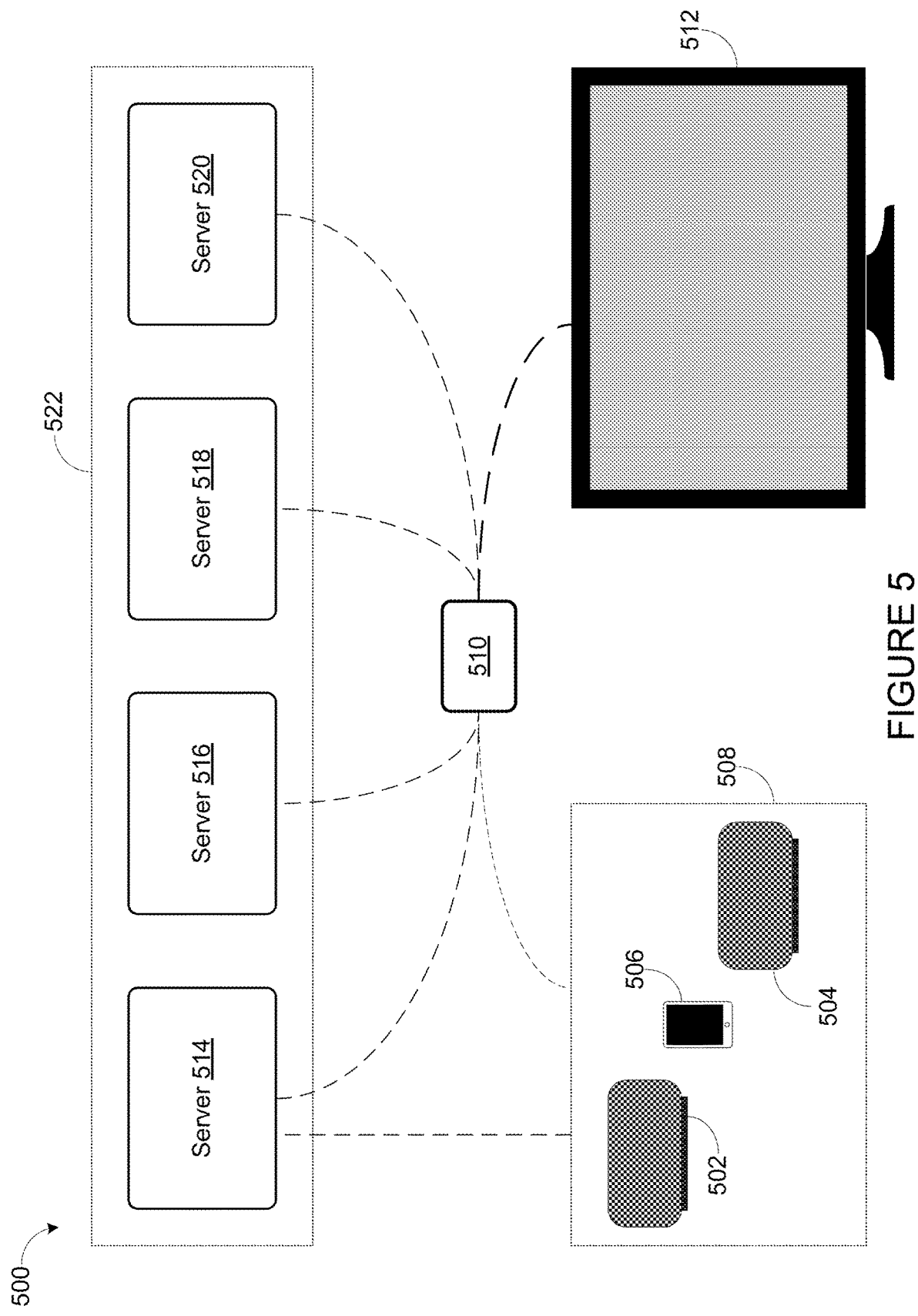
FIG. 5 shows an example media playback system environment.

As indicated above, discussions herein involve providing for display, information associated with a media item being played by a media playback system. FIG. 5 shows an example media playback system environment 500 within which method 600, as will be discussed below in connection to FIG. 6, may be performed. As shown, the media playback system environment 500 includes a computing device 510, a media playback system 508, a graphical display 512, and servers 522.

The computing device 510 may be a network device that can be communicatively coupled to one or more other network devices via any suitable wired or wireless interface and protocol. For instance, the computing device 510 may be communicatively coupled to the one or more other network devices via one or more of a local area network (LAN), a wide area network (WAN), near field communication (NFC), and Bluetooth, among other possibilities. In one example, the computing device 510 may be communicatively coupled to the media playback system 508 via a LAN. In another example, the computing device 510 may be communicatively coupled to the servers 522 via both the LAN and a WAN. In a further example, the computing device 510 may be coupled to the graphical display 512 via a wired. Other example configurations between the computing device 510 and the one or more other devices are also possible.

In one example, the computing device 510 may be a component of a "smart TV" having the graphical display 512. In another example, the computing device 510 may be a device that can be coupled to a television having the graphical display 412. In one case, the computing device 510 may be a dongle type device that can be coupled (i.e. plugged in) to the television via a universal serial bus (USB) interface and/or a high-definition multimedia interface (HDMI). In another case, the computing device 510 may be a set-top box type device that can be coupled to the television having the graphical display 512 via a USB interface, HDMI, or A/V cables, among other possibilities. In a further case, the computing device 510 may be a personal computer, and the graphical display 412 may be a display monitor for the personal computer. Whichever the case, the computing device 510 may be configured to execute one or more applications for receiving and processing content to be displayed on the graphical display 512. Other examples are also possible.

The media playback system 508 includes a playback device 502, a playback device 504, and a control device 506. In discussions herein, communication with the media playback system 508 may involve communication with one or more of the playback device 502, the playback device 504, and the playback device 506.

The media playback system 508 may be a variation or representative of the media playback system 100 shown in and described in connection to FIG. 1. The playback device 502 and the playback device 504 may be similar to the playback device 200 shown in and described in connection to FIG. 2. The control device 506 may be similar to the control device 300 shown in and described in connection to FIG. 3. As discussed previously, the first playback device 506 and the second playback device 508 may play a media item individually or play a media item in synchrony, as part of a playback zone, or as part of a zone group. The control device 506 may be used to manage and control the first playback device 506 and the second playback device 508. Other examples are also possible.

The servers 522 include server 514, server 516, server 518, and server 520. The servers 522 may each be associated with a media information source from which data indicating information associated with media items may be received. For instance, the servers 522 may include a server associated with a media service provider, a server associated with a social network, a server associated with an internet search engine, and/or a server associated with a media information aggregation service, among other possibilities. In one example, the server 514 may be a server associated with a streaming media service provider from which the media playback system 508 may be configured to receive the media item for playback. The streaming media service provider may also provide information associated with the media item, in addition to providing audio data streams of the media item. The media playback system 508 may be communicatively coupled to the server 514 via a LAN and/or a WAN. Other examples are also possible.

Figure 6:
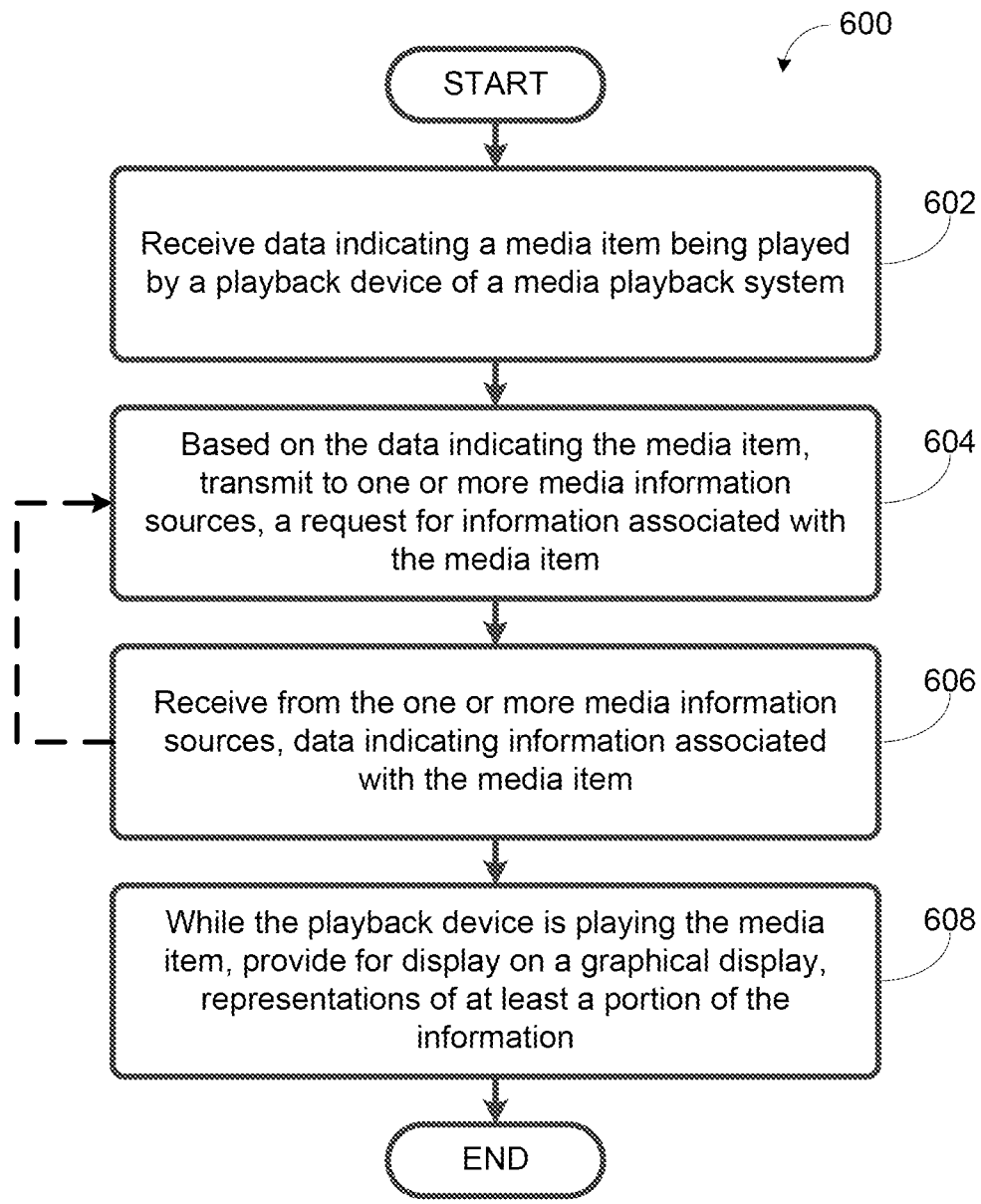
FIG. 6 shows an example flow diagram of a method for providing information associated with a media item.

FIG. 6 shows an example flow diagram of a method 600 for providing information associated with a media item. Method 600 presents an example of a method that can be implemented within an operating environment involving, for example, the media playback system 100 of FIG. 1, one or more of the playback device 200 of FIG. 2, one or more of the control device 300 of FIG. 3, and/or the media playback system environment 500 of FIG. 5. In one example, the method 600 may be performed in whole or in part by a computing device in communication with a media playback system. For instance, the method 600 may be performed by the computing device 510 of FIG. 5. In such a case, the computing device 510 may have installed thereon a software application that includes instructions executable by a processor of the computing device 510 to cause the computing device 510 to perform the functions of method 600.

Method 600 may include one or more operations, functions, or actions as illustrated by one or more of blocks 602-608. Although the blocks are illustrated in sequential order, these blocks may also be performed in parallel, and/or in a different order than those described herein. Also, the various blocks may be combined into fewer blocks, divided into additional blocks, and/or removed based upon the desired implementation. In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block may represent circuitry that is wired to perform the specific logical functions in the process.

As shown in FIG. 6, the method 600 involves receiving data indicating a media item being played by a playback device of a media playback system at block 602, based on the data indicating the media item, transmitting to one or more media information sources, a request for information associated with the media item at block 604, receiving from the one or more media information sources, data indicating information associated with the media item at block 606, and while the playback device is playing the media item, providing for display on a graphical display, representations of at least a portion of the information.

a. Receiving Data Indicating a Media Item

At block 602, the method 600 involves receiving data indicating a media item being played by a playback device of a media playback system. Referring to FIG. 5, the computing device 510 may receive data indicating a media item being played by one or both of the playback devices 502 and 504 of the media playback system 508.

The data indicating the media item may indicate one or more of a track title of the media item, an artist name associated with the media item, an album name associated with the media item, a genre associated with the media item, a track identification associated with the media item, and a service provider from which the media item is streamed. For instance, the data indicating the media item may include metadata associated with the media item. In one case, the track identification associated with the media item may be unique to the service provider from which the media item is being streamed. As such, a different track identification associated with the media item may exist for another service provider. Other examples are also possible.

In one example, prior to receiving the data indicating the media item being played by the playback device, the computing device 510 may have transmitted to one or more of the devices in the media playback system 510, a request for the data indicating the media item being played. In other words, the data indicating the media item may have been received by the computing device 510 in response to a request for the data by the computing device.

In another example, prior to receiving the data indicating the media item being played by the playback device, the computing device 510 may have subscribed to receive data indicating media items being played by the playback devices 502 and/or 504 in the media playback system 508. In one case, the computing device 510 may have subscribed to receive data indicating media items being played by any of the playback devices 502 and 504 in the media playback system 508. As such, one or more devices of the media playback system 508 may be configured to transmit to the computing device 510, when one or both of the playback devices 502 and 504 is playing a media item, data indicating the media item. As such, the data indicating the media item may be transmitted to and received by the computing device 510 each time one or more of the playback devices 502 and 504 begins playing a media item, or is about to play a media item.

In another case, the computing device 510 may have subscribed to receive only data indicating media items played by one of the playback devices 502 and 504. For instance, the computing device 510 may have subscribed to only receive data indicating media items played by the playback device 504. In such a case, the computing device 510 may receive, when the playback device 504 is playing a media item, or is about to play the media item, data indicating the media item. On the other hand, the computing device 510 may not receive data indicating media items being played by the playback device 502.

In a further case, the computing device 510 may have subscribed to a particular configuration of the playback device 502 and 504. For instance, the computing device 510 may have subscribed to only receive data indicating media items played by a zone group including both the playback device 502 and 504. As such, the computing device 510 may receive, when the playback device 502 and 504 are synchronously playing a media item as a zone group, data indicating the media item being played by zone group of both playback devices 502 and 504. Other examples are also possible.

In one example, the computing device 510 may receive the data indicating the media item via a communication interface provided by a software application associated with the media playback system that is installed on the computing device 510. As indicated previously, the software application may include instructions executable by a processor of the computing device 510 to cause the computing device 510 to perform the functions of method 600. In one case, the computing device 510 may not receive any data indicating any media item being played by the media playback system 508 unless the software application is running. Accordingly, prior to receiving the data indicating the media item being played by the playback device, the computing device 510 may receive a command to launch the software application.

In one case, the command to launch the software application may be based on an input from a user of the computing device 510. For instance, the software application may be launched when the computing device 510 is powered on. In another case, the command to launch the software application may be based on an input from the media playback system 508. For instance, the computing device 510 and devices of the media playback system 508 may both have implemented thereon a Universal Plug and Play (UPnP) protocol such that the computing device 510 and the devices of the media playback system 508 are capable of discovering one another over a network (i.e. a LAN or WAN as described in connection to FIG. 5). In such a case, upon discovery of the computing device 510 by one or more devices of the media playback system 508, the media playback system 508 may transmit to the computing device 510, a command to launch the software application, and the computing device 510 may responsively launch the software application. Alternatively, upon discovery of the media playback system 508 by the computing device 510, the computing device 510 may automatically launch the software application. Upon launching the software application, the computing device 510 may transmit to one or more devices in the media playback system, such as the playback device 502, the playback device 504, or the control device 506, data indicating that the software application is running.

In one example, the computing device 510 may not already have the software application associated with the media playback system 508 installed thereon. In such a case, the media playback system 508, upon discovering the computing device 510 may transmit to the computing device 510, a command to launch the software application that further indicates a uniform resource identifier (URI) of where the software application can be downloaded. As such, the computing device 510 may download the software application using the URI and install the software application before launching the software application.

In one case, the URI may be included with all commands from the media playback system 508 to launch the software application. In another case, the command from the media playback system 508 to launch the software application may include the URI because media playback system 508 determined that the discovered computing device 510 does not have the software application installed. For instance, the media playback system 508 may maintain data identifying computing devices that have the software application installed. As such, if the computing device 510 is not identified in the maintained data, the command to cause the computing device 510 to launch the software application may accordingly indicate the URI. Other examples are also possible.

In one example, if only the playback device 502 is playing the media item, the computing device 510 may receive the data indicating the media item from the playback device 502 that is playing the media item. In another example, the computing device 510 may receive the data indicating the media item from the playback device 504, even if the playback device 504 is not playing the media item. The computing device 510 may receive the data indicating the media item from the playback device 504 instead of the playback device 502 because (i) the playback device 504 has a more reliable communicative connection with the computing device 510 (i.e. closer physical proximity, more robust wireless communication interface, etc.) than the playback device 502, (ii) the playback device 504 has more data processing bandwidth than playback device 502, and/or (iii) the playback device 504 was the device of the media playback system 508 that received from the computing device 510, a request for the data indicating the media item played by the playback device 502, among other possibilities.

In one case, the playback device 502 and the playback device 504 may be playing the media item in synchrony, and the computing device 510 may receive the data from one of the playback device 502 and playback device 504 playing the media item. For instance, the computing device 510 may receive the data from the playback device 502 instead of the playback device 504. The computing device 510 may receive the data from the playback device 502 instead of the playback device 504 because (i) the playback device 502 is a group coordinator for the synchronous playback of the media item by both playback device 502 and playback device 504, (ii) the playback device 502 has a more reliable communicative connection with the computing device 510 (i.e. closer physical proximity, more robust wireless communication interface, etc.) than playback device 504, (iii) the playback device 502 has more data processing bandwidth than playback device 504, and/or (iv) the playback device 502 was the device of the media playback system 508 that received from the computing device 510, a request for the data indicating the media item, among other possibilities.

In one example, the computing device 510 may receive the data indicating the media item from the control device 506 which can be used to control the media playback system 508. The computing device 510 may receive the data from the control device 506 instead of either of the playback devices 502 and 504 because (i) the control device 506 has a more reliable communicative connection with the computing device 510 (i.e. closer physical proximity, more robust wireless communication interface, etc.) than playback devices 502 or 504, (ii) the control device 506 has more data processing bandwidth than playback devices 502 or 504, and/or (iii) the control device 506 was the device of the media playback system 508 that received from the computing device 510, a request for the data indicating the media item, among other possibilities. Other examples are also possible.

b. Transmitting a Request for Information Associated With the Media Item

At block 604, the method 600 involves based on the data indicating the media item, transmitting to one or more media information sources, a request for information associated with the media item. The one or more media information sources may include one or more of a service provider from which the media item is streamed, a service provider from which the media item is available, a media information aggregation service, a social network interface, and a server associated with the media playback system. Some of the one or more media information sources may be capable of providing similar media information, while some of the one or more media information sources may be capable of providing media information unavailable from some others of the one or more media information sources.

For illustrative purposes, referring to FIG. 5, the server 514 may be a server associated with a streaming media service provider from which the media playback system 508 is receiving the media item being played, the server 516 may be a server associated with a social network, the server 518 may be associated with a media information aggregation service, and the server 520 may be associated with an internet search engine. In discussions herein, communications between the computing device 510 and one or more media information services may also be represented as communications between the computing device 510 and one or more of the servers 522. Other examples are also possible.

In one case, the computing device 510 may transmit the request for information to each of a plurality of media information sources in communication with the computing device 510. For instance, the computing device 510 may transmit the request for information to each of the servers 522.

In another case, the computing device 510 may transmit the request for information to only a subset of the plurality of media information sources in communication with the computing device 510 has access to. In one example, the computing device 510 may identify from the plurality of media information sources in communication with the computing device 510, the one or more media information sources from which information associated with the media item is available. For instance, if the data indicating the media item indicates that the genre of the media item is "classic rock" and a first of the plurality of media information sources is a media information aggregation source for "rock 'n roll" media items, the computing device 510 may identify the first of the plurality of media information sources as one from which information associated with the media item is available, and transmit a request to the first of the plurality of media information sources. On the other hand, if a second of the plurality of the media information sources is a media aggregation source for "hip hop" media items, the computing device 510 may identify the second of the plurality of media information sources as one from which information associated with the media item is not available, and accordingly not transmit a request to the second one of the plurality of media information sources. Other examples are also possible.

In one example, prior to transmitting the request for information to the one or more media information sources, the computing device 510 may receive data identifying the one or more media information sources. In one example, the computing device 510 may transmit to the media playback system 508, a request for data identifying the one or more media information sources, and responsively, receive data identifying the one or more media information sources. In one example, the media playback system 508 may be associated with a first media information source and not a second media information source. For instance, a user account (i.e. email address, username, etc.) used by the media playback system 508 to access media content from the streaming media service server 514 may also be used to access the first media information source (i.e. via a paid subscription), but not the second media information source. In such a case, the computing device 510 may receive data identifying the first media information source as a media information source from which the computing device 510 is to request information. The data may further indicate the user account via which the computing device 510 can request the information. Other examples are also possible.

As indicated, the request for information may be based on the received data indicating the media item. For instance, the request for information may identify a track title, an artist name, album title, a genre, and/or a track identification, among other possibilities. In other words, in some cases, the request for information may include metadata associated with the media item.

In one example, the computing device 510 may send similar requests for information to each of the servers 522. In another example, the computing device 510 may send different requests for information to the servers 522 based on the media information source each server is associated with.

For instance, if the media information source is a media service provider from which the media item is being streamed, or is available to be streamed, the request for information may include the track identification for the media item corresponding to the media service provider. On the other hand, if the media information source is not a media service provider, the request for information may omit any track identification of the media item. Instead, in such a case, the request may indicate just the track title, artist name, album title, and/or genre associated with the media item, among other examples. In another instance, if the media information is an internet search engine, the request for information may include various search terms and/or combinations of search terms for retrieving information associated with the media item. Other examples are also possible.

c. Receiving Data Indicating Information Associated with the Media Item

At block 606, the method 600 involves receiving from one or more media information sources, data indicating information associated with the media item. Continuing with the examples above, the computing device 510 may receive from the servers 522, data indicating information associated with the media item.

The information associated with the media item may include one or more of biographical information associated with an artist of the media item, one or more facts about the media item, one or more images associated with the media item, information associated with a genre of the media item, one or more artists similar to the artist of the media item, one or more media items similar to the media item being played, social media content associated with the media item, social media content associated with the artist of the media item, and song lyrics associated with the media item, among other possibilities.

In one example, the data indicating the information associated with the media item may be data containing the information. For instance, if the information includes one or more images associated with the media item, the data may contain image data of the one or more images. In another example, the data indicating the information associated with the media item may include one or more uniform resource identifiers (URIs) of the information associated with the media item. For instance, if the information includes a video associated with the media item, the data may indicate a URI from which the computing device 510 can access the video. Other examples are also possible.

As indicated above, the computing device 510 may receive the data indicating the information at block 606, in response to the request for information transmitted at block 604. In one example, the computing device 510 may transmit requests for information to each of the one or more media information sources at substantially the same time. Subsequently, the computing device 510 may receive from the one or more media information sources, respective data indicating information associated with the media item. In such a case, a particular request for information that was sent to a media information source may be independent of any other requests for information sent to other media information sources or any information received from any of the media information sources.

In some examples, as shown in FIG. 6, blocks 604 and 606 of method 600 may be iteratively executed. In one case, the computing device 510 may iteratively transmit requests to each of the one or more media information sources according to respective information priorities corresponding to each media information source, and iteratively receive information associated with the media item in response to the transmitted requests.

In one case, a media information source that is a media service provider or a media information aggregation service may offer information that is more consistent and/or reliable than a media information source that is an internet search engine or a social network. In such a case, the media service provider or media information aggregation service may have higher respective information priorities than the internet search engine or social network. In some instances, primary media information sources may be capable of providing media information unavailable from secondary media information sources. Analogously, in some instance, secondary media information sources may be capable of providing media information unavailable from primary media information sources.

In discussions herein, a media information source having a higher information priority may be referred to as a primary media information source, while a media information source having a lower information priority may be referred to as a secondary media information source.

In one instance, an information priority of a media information source may be determined by the computing device 510 based on characteristics of the media information source, as indicated above. In another instance, the information priority of the media information source may be provided by the media playback system 508 and/or a user of the computing device 510 during setup of the computing device 510. For instance, the user may indicate a preference for a particular media information source over another media information source.

In one case, the computing device 510 may receive, prior to transmitting the request for information associated with the media item, data indicating that a first of the one or more media information sources is a primary media information source, and a second of the one or more media information sources is a secondary media information source. The data indicating the primary and secondary media information sources may further indicate that the secondary media information source is a media information source from which to request information otherwise not available from the primary media information source.

The computing device 510 may then, according the data indicating the primary and secondary media information sources, transmit to the primary media information source, a first request for first information associated with the media item; receive from the primary media information source, first data indicating first information associated with the media item; and subsequently transmit to the secondary media information source, a second request for second information based on the information from the primary media information source. In one case, the second request for second information may be a request for information not available and/or not provided by the primary media information source. In such a case, the computing device 510 may then responsively receive from the secondary media information source, second data indicating second information associated with the media item that includes information not included in the first information.

d. Providing for Display, Representations of the Information

At block 608, the method 600 involves while the playback device is playing the media item, providing for display on a graphical display, representations of at least a portion of the information. In one example, providing the representations for display on the graphical display may involve the computing device 510 categorizing at least the portion of the information associated with the media item, and providing for display on the graphical display 512, the representations of at least the portion of the information according to an information-display template for the graphical display, and one or more categories of at least the portion of the information. In one case, the information-display template may define the one or more categories.

For instance, the information-display template may include an artist biography section and a social media section. As such, the computing device 510 may parse the received data to determine the information indicated by the data, and categorize the information as either relating to artist biography or social media. The computing device 510 may then cause representations of the information to be displayed in either the artist biography section or the social media section based on the categorization of the information.

In one example, some information from different media information sources may be categorized into the same category. In another example, the information may be categorized at least partially based on the media information source from which the information was received.

In one example, the information-display template may be modified based on the information available. For instance, if the information-display template includes a section for displaying a music video associated with the media item, but no music video associated with the media item is available, the information-display template may be dynamically modified such that the section for displaying the music video becomes a section for displaying photos associated with the artist of the media item. Other examples are also possible.

Figure 7:
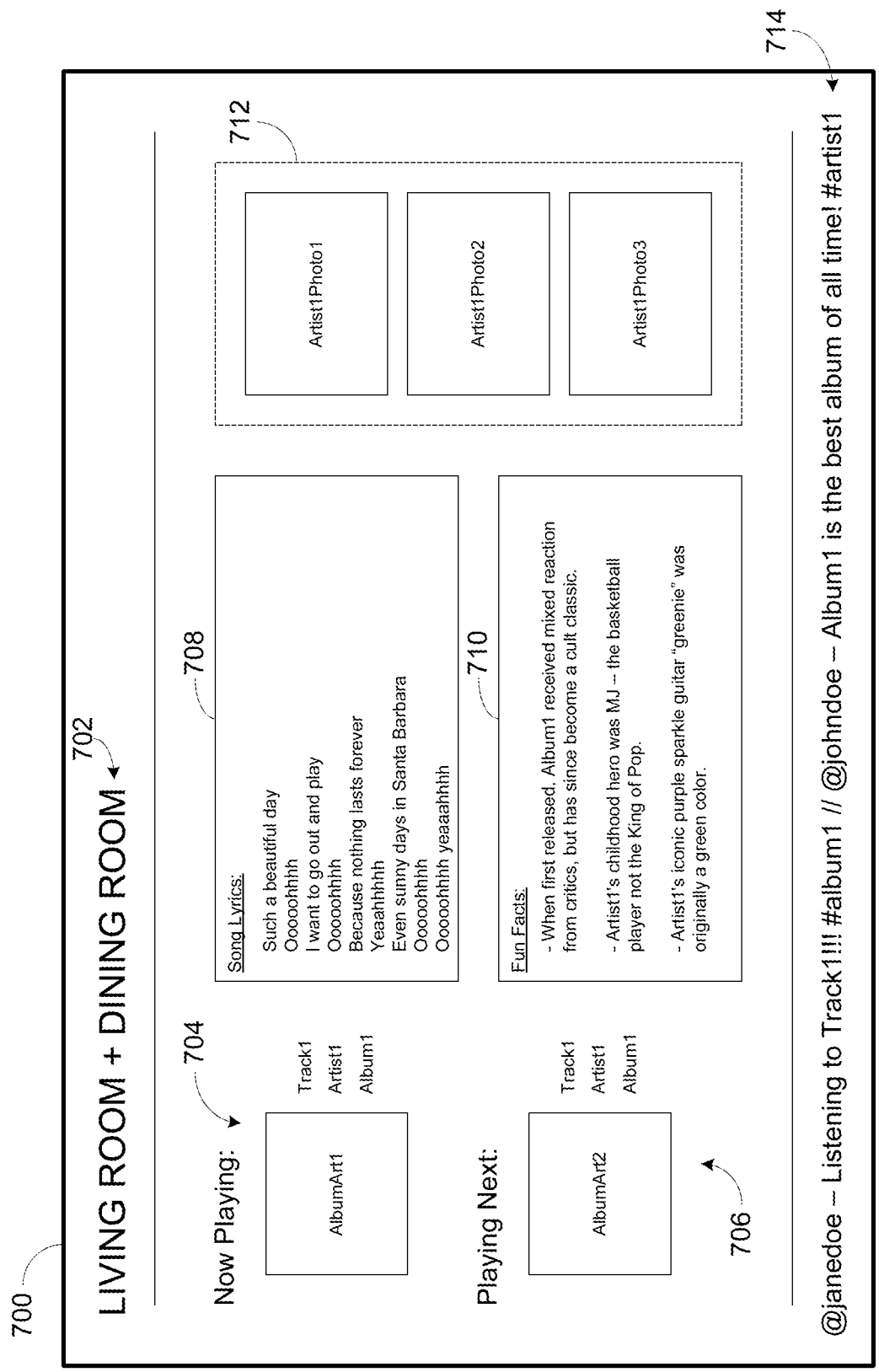
FIG. 7 shows an example display of information associated with a media item.

FIG. 7 shows an example display of information associated with a media item, as provided on a graphical interface 700. The graphical interface may be provided on the graphical display 512 by the computing device 510. One having ordinary skill in the art will appreciate that the representations shown as displayed on the graphical interface 700 is for illustrative purposes only, and that other examples within the scope of discussions herein are also possible.

As shown in FIG. 7, a representation 704 of information associated with the "Now Playing" media item being played by the media playback system 508 may be displayed on the graphical interface 700. In one example, the basic information 704 may be similar in content and scope to information provided on the control interface of the control device 506 while the media item is being played by the media playback system 508. In one instance, the basic information 704 may have been received from the server 514 that is associated with the service provider from which the media item is streamed. As shown in this illustrative example, the media item being played has track title "Track1," is by artist "Artist1," and can be found in album "Album1" having album art "AlbumArt1."

As indicated above, the media playback system 508 may be a multi-zone media playback system. As such, the computing device 510 may further provide for display on the graphical display 512, a representation of a zone group associated with the playback devices 502 and/or 504 that is playing the media item. As shown in FIG. 7, a representation 702 of a zone group within which the media item is being played is provided. In this illustrative example, the playback device 502 may be in a "Living Room" zone group of the media playback system, while the playback device 504 may be in a "Dining Room" zone group of the media playback system. In this case, Track1 by Artist1 may be played by the playback devices 502 and 504 in a zone group "Living Room+Dining Room." In one example, data indicating the zone group within which the media item is being played may be received from the media playback system 508.

Also shown in FIG. 7, a representation 706 of information associated with a "Playing Next" media item that is to be played next in a playback queue is displayed on the graphical interface 700. Discussions herein have thus far generally related to the media item that is being played, or about to be played by the media playback system 508. Nevertheless, information associated with the media item that is next in the playback queue may also be requested, received, and displayed by executing functions similar to that described in connection to method 600 of FIG. 6.

For instance, the computing device 510 may receive data indicating the next media item that is to be played by the media playback system 508 subsequent to playback of the current media item. Then, based on the data indicating the next media item, the computing device 510 may transmit to at least one of the one or more media information sources, a request for next media item information associated with the next media item. Subsequently, the computing device 510 may receive from the one or more media information sources, data indicating the next media item information associated with the second media item, and responsively, while the media playback system 508 is playing the current media item, provide for display on the graphical display 512, representations of at least a portion of the next media item information. One having ordinary skill in the art will appreciate that various embodiments discussed in connection to method 600 of FIG. 6 may also be applicable to the display of information associated with the next media item.

Also as shown in FIG. 7, a representation 708 of "Song Lyrics" information associated with the media item being played, a representation 710 of "Fun Facts" information associated with the media item being played, a representation 712 of images associated with Artist 1 of the media item, and a representation 714 of social media information associated with the media item are provided.

As indicated above, the information represented by each of the representations 704-714 may be from a single media information source, or multiple media information sources. For instance, the Fun Facts information represented by representation 710 may be from multiple media information sources, while the Song Lyrics information represented by representation 708 may be from a single information source.

In one example, the images associated with Artist 1 that is represented by representation 712 may be provided by a media information source that is an Internet search engine, via an image search for Artist 1. In this case, the representation 710 may be a web-interface configured to return and display results of the image search for Artist 1. In other words, the representation 710 may be displaying information provided from a URI associated with the image search.

In one example, the representations of information may be displayed dynamically. In one case, the representation 708 of Song Lyrics information may be configured to scroll dynamically according to a playback progress of the media item by the media playback system 508. In another case, the representation 714 of social media information may be dynamically updated whenever new social media associated with the media item becomes available. Analogous to the example of the representation 710 above, the representation 714 may be a social media interface configured to return and display results of a search for social media associated with the media item. Accordingly, the representation 714 may be displaying information provided from a URI associated with the social media search. As such, the representation 714 may be dynamically updated whenever the social media search returns new social media. Other examples are also possible.

In one example, the computing device 510 may provide for display on the graphical display 512, representations of at least the portions of the information after all data indicating the information has been received, and processed. In another example, the computing device may provide for display on the graphical display, representations of at least the portions of the information as data indicating the information is received, and processed. For instance, if data indicating the Song Lyrics information of the media item is received and processed before data indicating the Fun Facts information associated with the media item, the representation 708 may be displayed before the representation 710.

In one case, as indicated previously, data indicating first information may be received (and processed) before data indicating second information because a first media information source providing the first information may have received a request for the first information before a second media information source providing the second information received a request for the second information. In another case, data indicating first information may be received (and processed) before data indicating second information because the first media information source providing the first information may have a greater processing capability or bandwidth than the second media information source providing the second information. Other examples are also possible.

While discussions herein generally refer to media items being played by the media playback system 508, or information associated with media items being played by the media playback system 508, one having ordinary skill in the art will understand that the examples herein may also apply to media items that are about to be played. Further, the examples herein may further be applied to a media item that has been selected, but is not necessarily being played, about to be played, or scheduled to be played next in a playback queue.

For instance, the information requested for and subsequently displayed may be associated with a media item in a playback queue or media item catalog that has been selected via the control device (but not necessarily for playback). In other words, the functions as described in connection to the method 600 of FIG. 6 may alternatively be performed in response to a selection of a representation of a media item on a control interface, rather than a playback of the media item. Other examples are also possible.

Further, while discussions herein generally refer to displaying information associated with a media item being played in one zone group, one having ordinary skill in the art will appreciate that the computing device 510 may further be configured to receive information associated with media items being played in multiple, different zone groups, and responsively cause for display, information associated with the media items being played in the multiple zone groups. In one case, the different zone groups may be zone groups within a single household, or zone groups associated with a single media playback system. In another case, the different zone groups may be zone groups within a plurality of households, or zone groups associated with multiple media playback systems.

In one example, the computing device 510 may receive data indicating media items being played in the different zone groups, request and receive information associated with the media items, and cause for display, at least portions of the received information associated with the media items being played in the different zone groups. In one case, the computing device 510 may cause for display at the same time, the information associated with the media items played in the different zone groups. For instance, information-display template may include sub-regions corresponding to the different zone groups playing media items.

In another case, the computing device 510 may cause for display, one zone group at a time, information associated with a media item being played in a particular zone group out of the different zone groups. In such a case, the computing device 510 may cause for display the information associated with the media item being played in the particular zone group based on an input to display the information associated with media items played in the particular zone group. In one instance, the input may indicate a selection of the particular zone group (i.e from a user input via a drop down menu of zone groups). In such an instance, a subsequent input indicating a selection of another zone group may cause information associated with media items being played in the other zone group to be displayed. In another instance, the input may indicate that the graphical display 412 is physically located within the particular zone group. Other examples are also possible.

In another example, the computing device 510 may be in communication with multiple graphical displays. For instance, while the computing device 510 is causing for display on the graphical display 512, information associated with a media item being played in a first zone group, the computing device 510 may also receive data indicating a media item being played in a second zone group, request and receive information associated with the media item being played in the second zone group, and cause for display on a second graphical display, at least a portion of the information associated with the media item being played in the second zone group. In one case, the first graphical display may be physically located in an area corresponding to the first zone group, and the second graphical display may be physically located in an area corresponding to the second zone group. Other examples are also possible.

In yet another example, the computing device 510 may correspond to a specific zone group, and may be configured to receive data indicating a media item being played in the specific zone group, request and receive information associated with the media item played in the specific zone group, and provide for display on the graphical display 512, at least a portion of the information associated with the media items played in the specific zone group. In one case, the graphical display 512 may be configured to display information associated with media items played in another zone group, only if and when the specific zone group is not playing any media item. In another case, the graphical display 512 may be configured to not display information associated with any media item, if the specific zone group is not playing any media item, even if media items are being played in other zone groups. Other examples are also possible.

In one case, the media playback system environment 500 may include a second computing device in addition to the computing device 510 corresponding to the specific zone group, as described in the above example. The second computing device may correspond to a second specific zone group and may be configured to receive data indicating a media item being played in the second specific zone group, request and receive information associated with the media item played in the second specific zone group, and provide for display on a second graphical display, at least a portion of the information associated with the media items played in the second specific zone group.

In this example, if the specific zone group and the second specific zone group are combined into a single zone group to play a media item in synchrony, the graphical display 512 and the second graphical display may display substantially similar information associated with the media item played in synchrony in the single combined zone group. Other examples are also possible.

IV. CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computing device comprising:
    at least one processor;
    at least one non-transitory computer-readable medium comprising program instructions that are executable by the at least one processor such that the computing device is configured to:
    receive data indicating a media item being played by at least one of a first playback device or a second playback device of a media playback system, wherein the data is received, based on a condition of the media playback system and from one of: (i) the first playback device, (ii) the second playback device, or (iii) a control device of the media playback system;

based on the received data indicating the media item, transmit, to one or more media information sources, a request for information associated with the media item;

receive, from the one or more media information sources, additional data indicating information associated with the media item; and while the at least one of the first playback device or the second playback device is playing the media item, provide for display, on a graphical display, representations of at least a portion of the information.

2. The computing device of claim 1, wherein:
the condition of the media playback system includes reliability of a communicative connection between the computing device and each of the first playback device, the second playback device and the control device; and the data indicating the media item being played is received from the one of the first playback device, the second playback device or the control device which has a more reliable communicative connection with the computing device.

3. The computing device of claim 1, wherein:
the condition of the media playback system includes a data processing bandwidth of each of the first playback device, the second playback device and the control device; and the data indicating the media item being played is received from the one of the first playback device, the second playback device or the control device which has more data processing bandwidth.

4. The computing device of claim 1, wherein:
the condition of the media playback system includes a request for the data indicating the media item being played by a playback device, the request received from the computing device by one of the first playback device, the second playback device or the control device; and the data indicating the media item being played is received from the one of the first playback device, the second playback device or the control device which received the request.

5. The computing device of claim 1, wherein:
the first playback device and the second playback device are members of a group configured for synchronous playback of the media item;

one of the first playback device or the second playback device is a group coordinator; and the data indicating the media item being played is received from the group coordinator.

6. The computing device of claim 1, wherein the graphical display comprises a display of the computing device.

7. The computing device of claim 1, further comprising:
an interface for external devices;
wherein the graphical display comprises a display of a display device which is coupled to the computing device via the interface.

8. The computing device of claim 7, wherein the interface includes one or more of:
a wireless connection interface;
a Universal Serial Bus (USB) interface;
a high-definition multimedia (HDMI) interface; or
an audio/video (A/V) interface.

9. The computing device of claim 1, wherein:
the data indicating the media item comprises a Uniform Resource Identifier (URI) or a Uniform Resource Locator (URL).

10. The computing device of claim 1, wherein:
the one or more media information sources comprise one or more of a server, a media service provider, a media service aggregation service, a social network interface, or an internet search engine.

11. The computing device of claim 1, wherein the program instructions are executable by the at least one processor such that the computing device is configured to:
transmit a request to one or more of (i) the first playback device, (ii) the second playback device, or (iii) the control device to communicate data indicating a media item being played by at least one of the first playback device or the second playback device, wherein after transmitting the request, the computing device receives the data indicating the media item being played by the at least one of the first playback device or the second playback device.

12. A tangible, non-transitory computer-readable medium having stored thereon instructions executable by one or more processors to cause a computing device to perform functions comprising:

receiving data indicating a media item being played by at least one of a first playback device or a second playback device of a media playback system, wherein the data is received, based on a condition of the media playback system, from one of: (i) the first playback device, (ii) the second playback device, or (iii) a control device of the media playback system;

based on the received data indicating the media item, transmitting, to one or more media information sources, a request for information associated with the media item;

receiving, from the one or more media information sources, additional data indicating information associated with the media item; and while the at least one of the first playback device or the second playback device is playing the media item, providing for display, on a graphical display, representations of at least a portion of the information.

13. The tangible, non-transitory computer-readable medium of claim 12, wherein:
the condition of the media playback system includes reliability of a communicative connection between the computing device and each of the first playback device, the second playback device and the control device; and the data indicating the media item being played is received from the one of the first playback device, the second playback device or the control device which has a more reliable communicative connection with the computing device.

14. The tangible, non-transitory computer-readable medium of claim 12, wherein:
the condition of the media playback system includes a data processing bandwidth of each of the first playback device, the second playback device and the control device; and the data indicating the media item being played is received from the one of the first playback device, the second playback device or the control device which has more data processing bandwidth.

15. The tangible, non-transitory computer-readable medium of claim 12, wherein:
the condition of the media playback system includes a request for the data indicating the media item being played by a playback device, the request received from the computing device by one of the first playback device, the second playback device or the control device; and the data indicating the media item being played is received from the one of the first playback device, the second playback device or the control device which received the request.

16. The tangible, non-transitory computer-readable medium of claim 12, wherein:

the first playback device and the second playback device are members of a group configured for synchronous playback of the media item;

one of the first playback device or the second playback device is a group coordinator; and the data indicating the media item being played is received from the group coordinator.

17. The tangible, non-transitory computer-readable medium of claim 12, wherein the instructions are executable by the one or more processors to cause the computing device to perform functions comprising:

transmitting a request to one or more of (i) the first playback device, (ii) the second playback device, or (iii) the control device to communicate data indicating a media item being played by at least one of the first playback device or the second playback device, wherein after transmitting the request, the computing device receives the data indicating the media item being played by the at least one of the first playback device or the second playback device.

18. A method to be performed by a computing device, the method comprising:

receiving data indicating a media item being played by at least one of a first playback device or a second playback device of a media playback system, wherein the data is received, based on a condition of the media playback system, from one of: (i) the first playback device, (ii) the second playback device, or (iii) a control device of the media playback system;

based on the received data indicating the media item, transmitting, to one or more media information sources, a request for information associated with the media item;

receiving, from the one or more media information sources, additional data indicating information associated with the media item; and while the at least one of the first playback device or the second playback device is playing the media item, providing for display, on a graphical display, representations of at least a portion of the information.

19. The method of claim 18, wherein:

the condition of the media playback system includes reliability of a communicative connection between the computing device and each of the first playback device, the second playback device and the control device; and the data indicating the media item being played is received from the one of the first playback device, the second playback device or the control device which has a more reliable communicative connection with the computing device.

20. The method of claim 18, further comprising:

transmitting a request to one or more of the (i) the first playback device, (ii) the second playback device, or (iii) the control device to communicate data indicating a media item being played by at least one of the first playback device or the second playback device, wherein after transmitting the request, the computing device receives the data indicating the media item being played by the at least one of the first playback device or the second playback device.

* * * * *